United States Patent
Hull et al.

(10) Patent No.: US 6,265,104 B1
(45) Date of Patent: Jul. 24, 2001

(54) HOT-MELT SEAL FOR METAL-AIR BATTERY

(75) Inventors: Matthew Hull, Jamestown, RI (US); Gary Searle, Norfolk, MA (US)

(73) Assignee: The Gillette Company, Boston, MA (US)

(*) Notice: Subject to any disclaimer, the term of this patent is extended or adjusted under 35 U.S.C. 154(b) by 0 days.

(21) Appl. No.: 09/374,278

(22) Filed: Aug. 13, 1999

(51) Int. Cl.[7] ............................ H01M 2/08; H01M 12/06
(52) U.S. Cl. ........................ 429/185; 429/171; 429/174; 29/623.2
(58) Field of Search ............................ 429/101, 174, 429/27, 131, 171, 185; 29/623.2

(56) References Cited

U.S. PATENT DOCUMENTS

| | | |
|---|---|---|
| 3,881,959 | 5/1975 | Tsuchida et al. . |
| 4,112,198 | 9/1978 | Przybyla et al. . |
| 4,166,157 * | 8/1979 | McCormick ........................ 429/174 |
| 4,248,944 | 2/1981 | Smilanich . |
| 4,256,815 | 3/1981 | Similanich et al. . |
| 4,343,869 * | 8/1982 | Oltman ................................ 429/27 |
| 4,390,384 | 6/1983 | Turner . |
| 4,404,266 | 9/1983 | Smilanich . |
| 4,451,542 | 5/1984 | Ishida et al. . |
| 4,460,663 | 7/1984 | Stutzbach et al. . |
| 4,469,764 | 9/1984 | Schumm, Jr. . |
| 4,666,799 | 5/1987 | Runquist et al. . |
| 4,804,593 | 2/1989 | Hara et al. . |
| 4,816,355 | 3/1989 | Kulibert et al. . |
| 4,938,833 | 7/1990 | Kaufman et al. . |
| 4,957,832 | 9/1990 | Ruggeberg et al. . |
| 5,134,046 | 7/1992 | Chow et al. . |
| 5,173,379 | 12/1992 | Ichinose et al. . |
| 5,229,223 | 7/1993 | Hyland . |
| 5,272,020 * | 12/1993 | Flack ................................... 429/141 |
| 5,324,332 * | 6/1994 | Jacus ................................ 29/623.2 |
| 5,462,819 * | 10/1995 | Jacus .................................. 429/174 |
| 5,500,308 | 3/1996 | West et al. . |
| 5,518,834 | 5/1996 | Yoshizawa et al. . |
| 5,603,157 | 2/1997 | Lake et al. . |
| 5,626,988 | 5/1997 | Daniel-Ivad et al. . |
| 5,705,294 | 1/1998 | Lake . |
| 5,750,283 | 5/1998 | DePalma et al. . |
| 5,776,631 | 7/1998 | Wu . |
| 5,783,329 | 7/1998 | Kilb . |
| 5,837,398 | 11/1998 | Adams et al. . |
| 5,843,597 | 12/1998 | Getz . |
| 6,033,799 * | 3/2000 | Heinz, Jr. ........................... 429/164 |
| 6,099,987 * | 8/2000 | Daniel-Ivad ....................... 429/141 |

FOREIGN PATENT DOCUMENTS

| | | |
|---|---|---|
| 0 920 066 A2 | 6/1999 | (EP) . |
| 0 940 869 A2 | 6/1999 | (EP) . |
| 0 940 866 A2 | 9/1999 | (EP) . |
| 0 940 870 A2 | 9/1999 | (EP) . |
| 0 940 871 A2 | 9/1999 | (EP) . |
| 0 940 872 A2 | 9/1999 | (EP) . |
| 0 940 873 A2 | 9/1999 | (EP) . |
| 0 940 874 A2 | 9/1999 | (EP) . |
| 0 940 875 A2 | 9/1999 | (EP) . |
| 591984-99656 | 6/1984 | (JP) . |
| 5-047388 | 2/1993 | (JP) . |
| 08-162173 | 6/1996 | (JP) . |
| 08-306398 | 11/1996 | (JP) . |
| 10-12288 | 1/1998 | (JP) . |

* cited by examiner

*Primary Examiner*—Gabrielle Brouillette
*Assistant Examiner*—Mark Ruthkosky
(74) *Attorney, Agent, or Firm*—Fish & Richardson P.C.

(57) ABSTRACT

A metal-air cell including (a) a container having a positive end and a negative end; (b) a cathode having an end adjacent to the positive end of the container and an end adjacent to the negative end of the container; (c) an anode; (d) a separator between the cathode and the anode; and (e) a seal between the end of the cathode adjacent to the positive end of the container and the positive end of the container is disclosed. The seal includes a hot melt material.

28 Claims, 5 Drawing Sheets

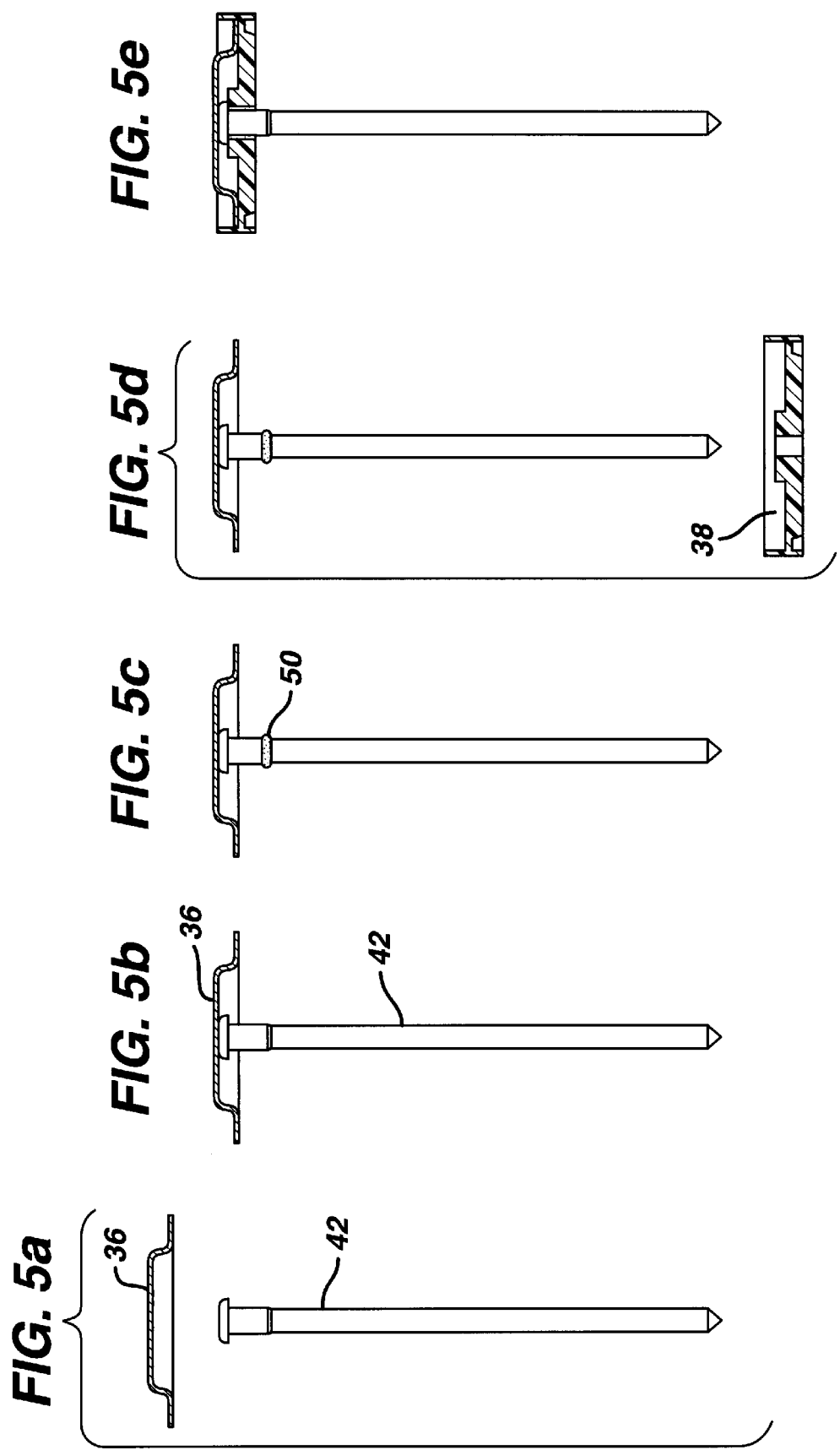

HOT-MELT SEAL FOR METAL-AIR BATTERY

BACKGROUND OF THE INVENTION

The invention generally relates to metal air electrochemical cells.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, such as a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In a metal air electrochemical cell, the cathode contains a material that can catalyze the reduction of oxygen which enters the cell as a component of atmospheric air passing through one or more access ports in the container. Zinc oxide, or zincate, is formed in the anode. Thus, the overall electrochemical reaction within the cell results in zinc metal being oxidized to zinc ions and oxygen from the air being reduced to hydroxyl ions. While these chemical reactions are taking place, electrons are transferred from the anode to the cathode, providing power to the device.

Metal-air cells require an air plenum between the cell container and the cathode. Since the cathode does not directly contact the inner surface of the container, electrical contact between these two components must be established in some other way.

In addition, because the container must have air access ports to allow air flow, the sides of the container are not sealed. Therefore, to prevent the electrolyte from leaking out, the top and the bottom of the container must be sealed. Many methods for sealing the ends of the containers of metal-air cells include the use of multiple components, such as cups, grommets and rings.

SUMMARY OF THE INVENTION

The metal-air battery of the invention features a simple design. One or both ends of the cell, or battery, container are sealed with hot melt materials. The use of hot-melt materials makes relatively fast, inexpensive manufacturing processes possible, and allows for a variety of cathode shapes to be used.

In one aspect, the invention features a metal-air cell including (a) a container having a positive end and a negative end; (b) a cathode having an end adjacent to the positive end of the container and an end adjacent to the negative end of the container; (c) an anode; (d) a separator between the cathode and the anode; and (e) a seal between the end of the cathode adjacent to the positive end of the container and the positive end of the container. The seal includes a hot melt material. In some embodiments, the seal consists essentially of hot melt material. In other embodiments, the hot melt material is conductive.

In another aspect, the invention features a metal-air cell including (a) a container having a positive end and a negative end; (b) a cathode having an end adjacent to the positive end of the container and an end adjacent to the negative end of the container; (c) an anode; (d) a separator between the cathode and the anode; and (e) a seal between the end of the cathode adjacent to the negative end of the container and the negative end of the container. The seal includes a hot melt material. In some embodiments, the seal consists essentially of hot melt material. In other embodiments, the hot melt material is conductive.

Hot melt materials are generally solids at room temperature and liquids at elevated temperatures, for example, temperatures above about 60° C., 80° C., or 100° C. The use of a hot melt material in the seal at the positive end of the battery container offers several advantages. First, it obviates the multiple components, such as cups, grommets, and crimping seals, used to seal many metal-air round cells. Second, it provides a tight seal for irregularly shaped cathode tubes. The seal accommodates irregularities, e.g., those that result from manufacturing tolerances. The seal can also accommodate a cathode with a seam, where the cathode is thicker where the separator and barrier overlap. Third, if a conductive hot melt material is used, the material both forms a seal and provides an electrical connection between the cathode current collector and the battery container.

In another aspect, the invention features a method of manufacturing a metal-air cell including (a) placing a hot melt material in a positive end of a container; (b) placing a cathode in the container while heating the container to a temperature sufficient to flow the hot melt material; and (c) pressing the cathode into the hot melt material to form a seal between an end of the cathode and the positive end of the container. The method can also include forming a seal at the negative end of the container using a hot melt material.

In still another aspect, the invention features a method of manufacturing a metal-air cell including (a) placing a hot melt material in a negative end of a container; (b) placing a cathode in the container while heating the container to a temperature sufficient to flow the hot melt material; and (c) pressing the cathode into the hot melt material to form a seal between an end of the cathode and the negative end of the container.

Other features and advantages of the invention will be apparent from the description of the preferred embodiments thereof, and from the claims.

BRIEF DESCRIPTION OF THE DRAWINGS

FIGS. 5a–e are cross-sectional views of top seals.

DESCRIPTION OF THE PREFERRED EMBODIMENTS

Figure 1C:
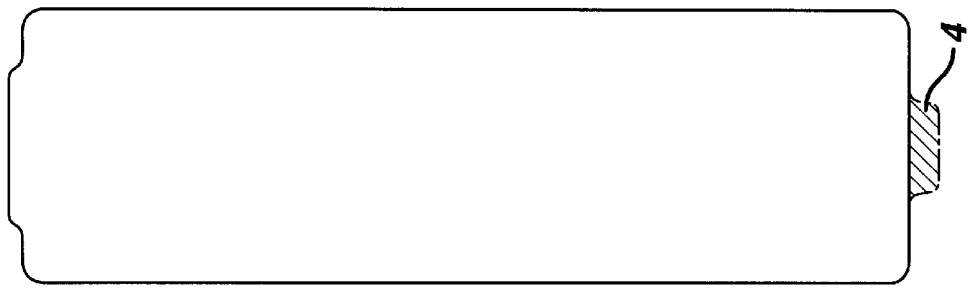
FIGS. 1a–1c are perspective views of battery containers.
Figure 1B:
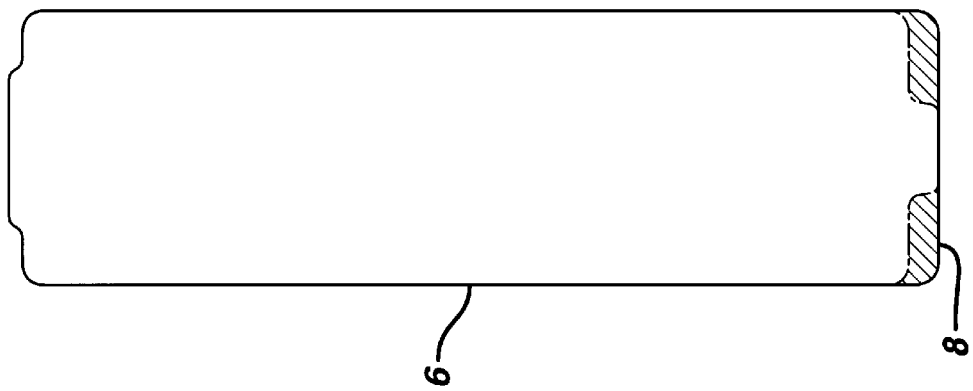
Figure 1A:
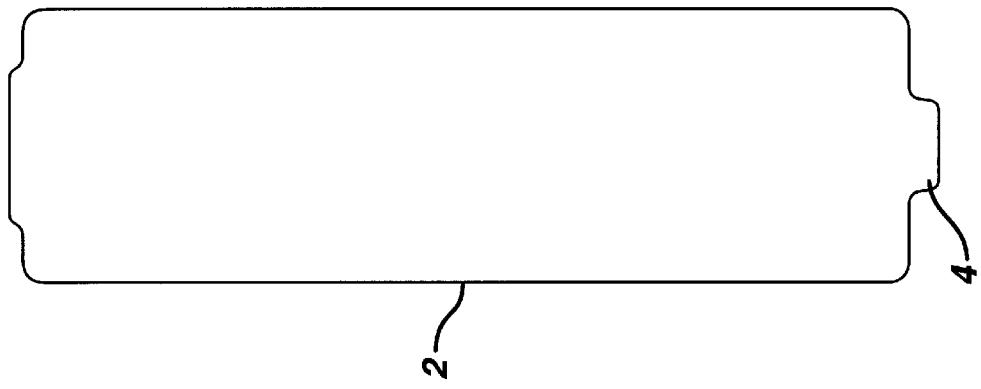

Referring to FIG. 1a, the container 2 for the battery can be similar to a container used for a primary alkaline cell. This container has a cup-shaped protrusion 4 at one end, referred to as a "pip."

Alternatively, the container 6 can have a flat surface 8 at the positive end, as shown in FIG. 1b. The flat bottomed container allows for easier manufacturing processes, for example, ease in welding to the bottom of the container. This container also allows for a more space-efficient design—the air space formerly wasted because of the pip (shown as the shaded region in FIG. 1b) can be filled with active material. These batteries are useful in applications such as battery packs.

In another embodiment, a battery can be assembled in a flat bottomed container. Following assembly, a pip can be welded onto the container. The pip is shown as a shaded region in FIG. 1c. The resulting battery has the same overall shape and dimensions as a corresponding alkaline cell and can therefore be used in the same applications as an alkaline cell. For examples, cylindrical AAAA, AAA, AA, C, or D cells can be prepared.

Figure 2A:
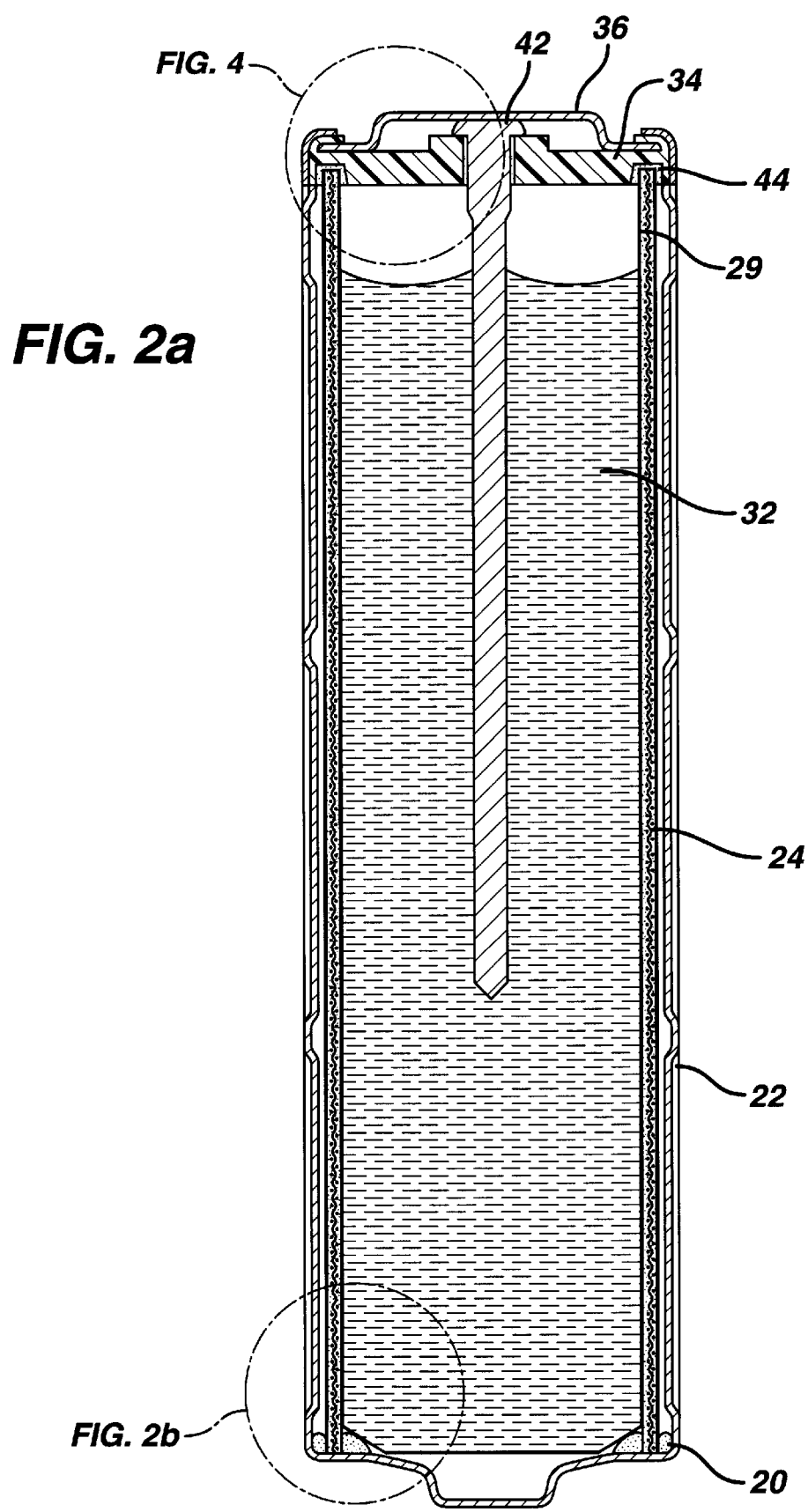
FIGS. 2a and b are cross-sectional views of batteries of the invention.

The batteries of the invention are assembled as follows. Referring to FIG. 2a, a hot melt material 20 is inserted into the positive end of the container 22. For example, a ring of hot melt material can be punched from a sheet, then placed at the bottom of the container. Alternatively, the hot melt material can be dispensed through a heated, pressurized nozzle. Heat is applied to the container at approximately the same time that the cathode 24 is pressed into it. The heat flows the hot melt material, making it pliable, as the cathode tube is pressed into it. Temperatures of at least about 120° C., at least about 130° C., or at least about 140° C. are sufficient to flow the hot melt material. The hot melt material does not have to be specially cut to fit the shape of the cathode tube. Instead, the hot melt material will conform to any shape that is pressed into it. The hot melt material helps to form a tight seal between the cathode and the container at the positive end of the cell.

Figure 2B:
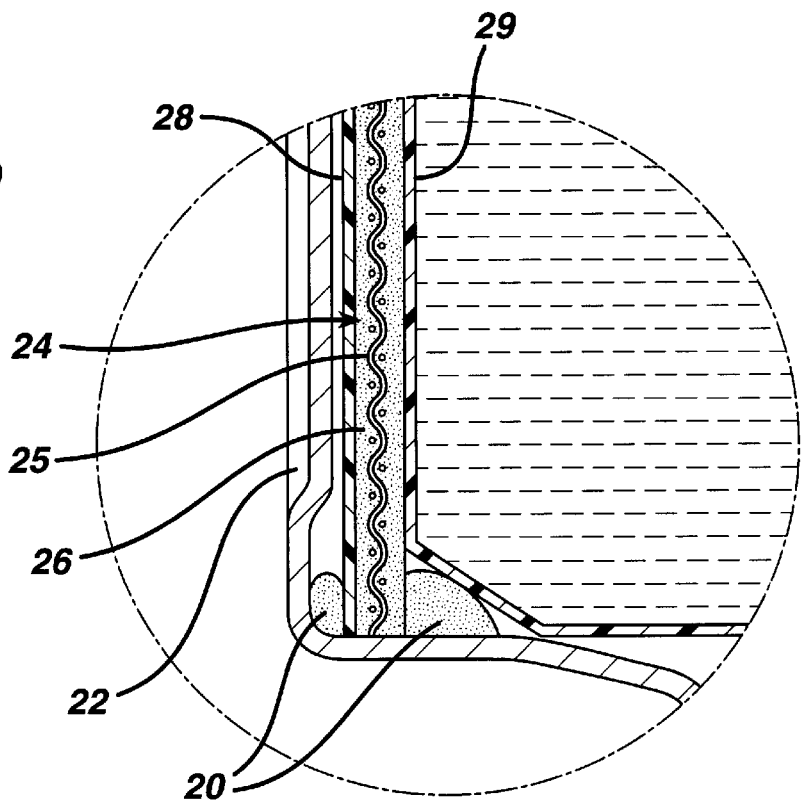

Referring to FIG. 2b, which is an expanded view of the circled region at the bottom left corner of FIG. 1a, the cathode 24 of the battery includes a current collector 25, such as a wire screen. An active cathode mixture 26 is deposited on this screen. This mixture includes a binder, carbon particles, and a catalyst for reducing peroxide. A useful binder includes one formed from polytetrafluoroethylene (PTFE) particles. Useful catalysts include manganese oxides, such as $Mn_2O_3$, $Mn_3O_4$, and $MnO_2$, that can be prepared, for example, by heating manganese nitrate or by reducing potassium permanganate.

The outside of the cathode 24, which faces the air access ports, can be covered by a PTFE membrane 28. The membrane helps maintain a consistent humidity level in the cell. The membrane also helps to prevent the electrolyte from leaking out of the cell and $CO_2$ from leaking into the cell.

An electrical connection must be made between the cathode current collector 25 and the container 22. This connection can be made in different ways, depending on the level of cell impedance that can be tolerated. When low cell impedance is required, a conductive tab, e.g., a foil tab, can be welded to the cathode current collector and to the bottom of the container. A container having a flat bottom is useful for these batteries, because it is easier to attach the tab to a flat surface than to one interrupted by a pip. In addition, if a container having a flat bottom is used, multiple tabs can be used. When a tab is used to provide electrical contact between the cathode current collector and the container, a non-conductive hot melt material may be used to form the seal at the positive end of the battery.

Alternatively, the cathode current collector 25 can be welded directly to the bottom of can 22. When the cathode current collector is welded to the bottom of the can, the active material must first be removed from the cathode to expose a portion of the current collector. A can with a flat surface provides a larger welding surface area; in addition, it is easier to weld the current collector to a flat surface than to one interrupted by a pip.

If higher cell impedance can be tolerated, a different method can be used to establish electrical contact between the cathode current collector and the container. The bottom edge of the cathode tube can be cleared of active material 26 to expose a portion of the current collector 25. The cathode tube is then pushed into the hot melt material until the exposed current collector contacts the bottom of the can. In this case, the hot melt material must be conductive.

Useful conductive hot melt materials include resins containing silver-coated glass beads. These materials are available from Chomerics, Inc. (Woburn, Mass.) and are described, e.g., in U.S. Pat. No. 4,011,360. In addition, Chomerics materials as supplied to Duracell, Inc. can be used. These materials are polyamide resins containing silver-coated particles. For example, sample numbers 4389-16-1 (polyamide resin containing 0.020 inch silver-coated copper particles), 4389-16-2 and 4389-19-1 (polyamide resin containing 0.020 inch silver particles), 4389-16-3 (polyamide resin containing 0.020 inch silver-plated glass beads), and 4389-19-2 (0.035 inch silver-coated glass beads) can be used. Polyamide resins containing silver-coated stainless steel particles, silver-coated nickel particles, and carbon particles can also be used.

Pure silver particles give the best performance, but are prohibitively expensive to use. The use of silver-coated copper particles or silver-coated stainless steel particles balances the concerns of performance and cost.

An asphalt sealant can also be used as a conductive sealing material. The asphalt sealant can be made conductive by loading it with the same conductive particles that are used to make polyamide resins conductive.

The conductive hot melt material should allow for a cell impedance of less than 0.1 ohms and should be compatible with KOH. The volume resistivity of the conductive material, which is a measure of how well the material can conduct an electrical current, can be measured, for example, using the disc method described in Mil-G-833528 para. 4.6.11. Volume resistivity can also be measured as described in the Chomerics EMI Shielding Engineering Handbook. Materials with volume resistivities of 10–20 ohm centimeters are preferred.

After the cathode tube has been inserted into the hot melt material, the can is cooled. A separator tube 29 is then inserted into the container. The separator tube can be a porous, electrically insulating polymer, such as polypropylene, that allows the electrolyte to contact the air cathode.

After the tube of separator material has been inserted into the container, a non-conductive hot melt material can be placed in the bottom of the tube. The hot melt material is heated to allow the material to flow and cover the bottom of the tube. The hot melt material forms a non-conductive insulator preventing contact between the anode and the conductive hot melt material.

Useful non-conductive hot melt materials include polyamides, available from Henkel Adhesives (Elgin, Ill.). A preferred material is MACROMELT® 6329, available from Henkel. Polyamide resins are generally resistant to KOH; these resins generally flow at temperatures of about 130° C. to about 150° C.

Figure 3:
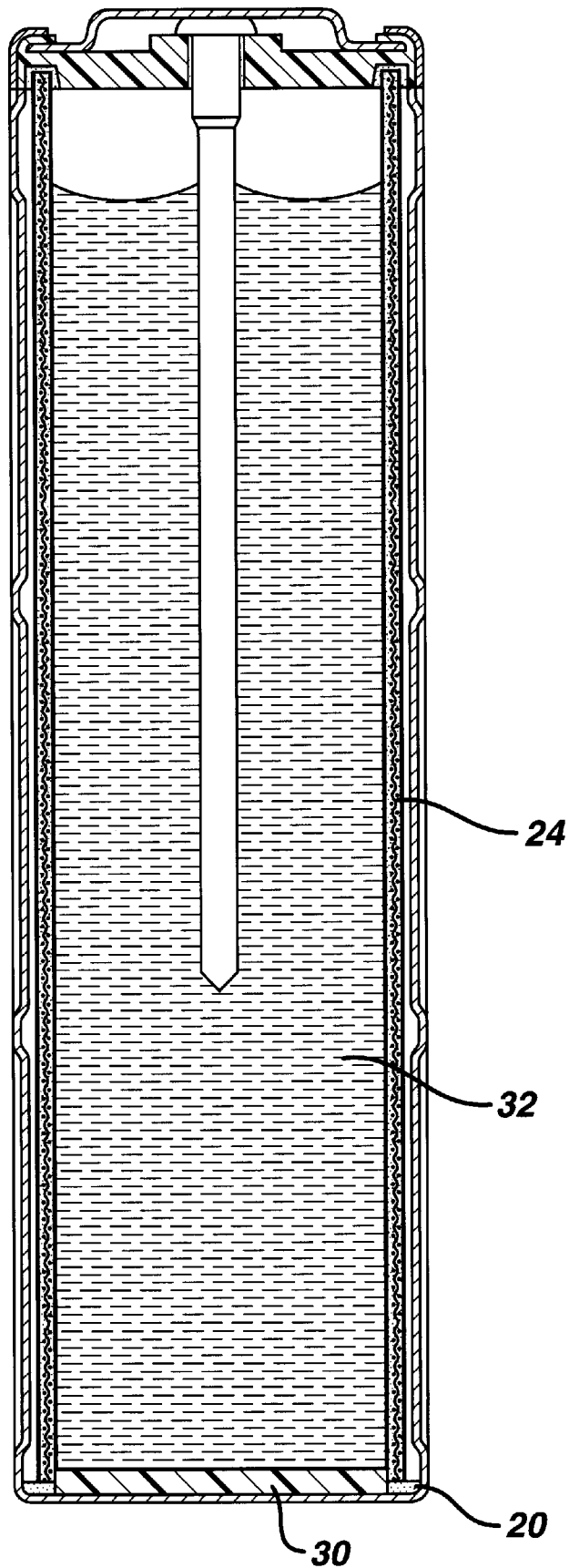
FIG. 3 is a cross-sectional view of a battery of the invention.

Alternatively, a disk 30 of an insulating polymer can be inserted into the bottom of the tube, as shown in FIG. 3. The disk is made of, e.g., a rigid plastic. The disk is inserted while the hot melt material at the positive end is still pliable. The insertion force reflows the hot melt material, and a seal is formed between the disk and the separator tube. If this method of providing an insulating layer at the end of the tube is used, it is preferable that a non-conductive hot melt material is used to form a seal at the positive end of the cell, because re-flowing hot melt material can cause shorts.

The inner cavity formed by the separator and the insulator is then filled with anode gel 32. The anode gel contains a mixture including zinc and electrolyte. The mixture of zinc and electrolyte can include a gelling agent that can help prevent leakage of the electrolyte from the cell and help suspend the particles of zinc within the anode.

The zinc material can be a zinc powder that is alloyed with lead, indium, aluminum, or bismuth. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. Alternatively, the zinc can include lead without other metal additives. The zinc material can be air blown or spun zinc. Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety. The zinc can be a powder. The particles of the zinc can be spherical or non-spherical. For example, the zinc particles can be acicular in shape (having an aspect ratio of at least two).

The zinc material includes a majority of particles having sizes between 60 mesh and 325 mesh. For example, the zinc material can have the following particle size distribution:

0–3 wt % on 60 mesh screen;
40–60 on 100 mesh screen;
30–50 wt % on 200 mesh screen;
0–3 wt % on 325 mesh screen; and
0–0.5 wt % on pan.

Suitable zinc materials include zinc available from Union Miniere (Overpelt, Belgium), Duracell (USA), Noranda (USA), Grillo (Germany), or Toho Zinc (Japan).

The gelling agent is an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. No. 4,541,871, U.S. Pat. No. 4,590,227, or U.S. Pat. No. 4,507,438.

In certain embodiments, the anode gel can include a non-ionic surfactant, and an indium or lead compound, such as indium hydroxide or lead acetate. The anode gel can include between about 50 and 500 ppm, preferably between 50 and 200 ppm, of the indium or lead compound. The surfactant can be a non-ionic phosphate surfactant, such as a non-ionic alkyl phosphate or a non-ionic aryl phosphate (e.g., RA600 or RM510, available from Rohm & Haas) coated on a zinc surface. The anode gel can include between about 20 and 100 ppm the surfactant coated onto the surface of the zinc material. The surfactant can serve as a gassing inhibitor.

The electrolyte can be an aqueous solution of potassium hydroxide. The electrolyte can include between about 30 and 40 percent, preferably between 35 and 40 of potassium hydroxide. The electrolyte can also include between about 1 and 2 percent of zinc oxide.

Figure 4:
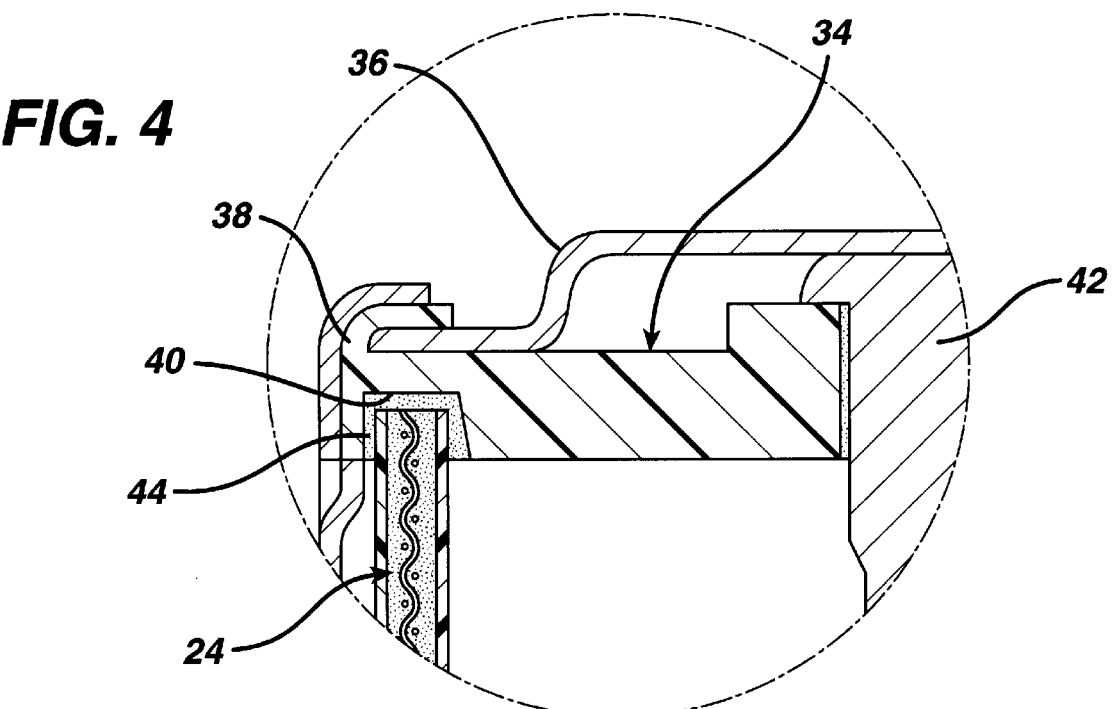
FIG. 4 is cross-sectional view of a top seal of the invention.

Referring to FIG. 4, which is an expanded view of the circled region in the upper left corner of FIG. 2a, the top assembly 34 for the battery includes a negative end cap 36, a potting seal 38 with a potting cavity 40, and a current collector 42. To prepare the assembly, the potting seal is injection molded. Useful materials for making the potting seal include nylon 6/6 resins (available from DuPont, Wilmington, Del., under the name Zytel 101F or from Nyltech, Inc., Manchester, N.H., under the trade name NYCOA 520), and nylon 612 resins (available from DuPont). The end cap 36 and current collector 42 are welded together, as shown in FIGS. 5a and 5b. The top assembly is then assembled by applying a material such as an asphalt adhesive 50 on the current collector, then inserting the current collector into the potting seal 38, as shown in FIGS. 5c–e. A hot melt material or an asphalt sealant 44 is dispensed in the potting cavity. The top assembly 34 is then inserted into the battery container until the cathode 24 engages the potting cavity 40, as shown in FIG. 4. The upper external periphery (i.e., the lip) of the container is then swaged down over the top assembly to seal the top assembly at the top of the cell.

Both conductive and non-conductive hot melt materials and sealants can be used to seal the negative end of the cell. Non-conductive materials are less expensive and therefore preferred. The hot melt materials can be the same as those described above. In addition, an asphalt sealant such as Asphalt B1128, available from BiWax Corp., can be used.

OTHER EMBODIMENTS

Although the above discussion generally relates to cylindrical cells (e.g., AAAA, AAA, AA, C, and D cells) conductive and non-conductive hot melt materials can also be used to seal metal-air batteries other than cylindrical batteries. For example, button cells and prismatic cells can be sealed with hot melt materials using the methods and materials described herein.

In addition, conductive and non-conductive hot melt materials can be used to seal metal-air batteries in which the polarity of the batteries is reversed relative to the batteries described above. For example, the above discussion relates generally to batteries in which the container is positive, and the end cap is negative. Hot melt materials can be used to seal batteries in which the container is negative and the end cap is positive, as well.

All publications and patents mentioned in this application are herein incorporated by reference to the same extent as if each individual publication or patent was specifically and individually indicated to be incorporated by reference.

Other embodiments are also within the scope of the following claims.

What is claimed is:

1. A metal-air comprising
   (a) a container having a positive end and a negative end;
   (b) a cathode having an end adjacent to the positive end of the container and an end adjacent to the negative end of the container;
   (c) an anode;
   (d) a separator between the cathode and the anode; and
   (e) a seal between the end of the cathode adjacent to the positive end of the container and the positive end of the container, the seal comprising a hot melt material.

2. The metal-air cell of claim 1, wherein the seal between the end of the cathode adjacent to the positive end of the container and the positive end of the container consists essentially of hot melt material.

3. The metal-air cell of claim 1, wherein the hot melt material is conductive.

4. The metal-air cell of claims 1 or 2, wherein the cathode includes a current collector, and wherein a conductive tab provides electrical contact between the cathode current collector and the positive end of the container.

5. The metal-air cell of claims 1, 2, or 3 wherein the cell is a cylindrical cell.

6. The metal-air cell of claims 1, 2, or 3 wherein the positive end of the container is substantially flat.

7. The metal-air cell of claims 1, 2, or 3 wherein the negative end of the container is sealed with a non-conductive hot melt material.

8. The metal-air cell of claims 1, 2, or 3 wherein the cell is a zinc-air cell.

9. The metal-air cell of claim 8, wherein the cell is a AAAA cell.

10. The metal-air cell of claim 8, wherein the cell is a AAA cell.

11. The metal-air cell of claim 8, wherein the cell is a AA cell.

12. The metal-air cell of claim 8, wherein the cell is a C cell.

13. The metal-air cell of claim 8, wherein the cell is a D cell.

14. A metal-air cell comprising
  (a) a container having a positive end and a negative end;
  (b) a cathode having an end adjacent to the positive end of the container and an end adjacent to the negative end of the container;
  (c) an anode;
  (d) a separator between the cathode and the anode; and
  (e) a seal between the end of the cathode adjacent to the negative end of the container and the negative end of the container, the seal comprising a hot melt material.

15. The metal-air cell of claim 14, wherein the seal between the end of the cathode adjacent to the negative end of the container and the negative end of the container consists essentially of hot melt material.

16. The metal-air cell of claim 14, wherein the hot melt material is conductive.

17. A method of manufacturing a metal-air cell comprising:
  (a) placing a hot melt material in a positive end of a container;
  (b) placing a cathode in the container while heating the container to a temperature sufficient to flow the hot melt material; and
  (c) pressing the cathode into the hot melt material to form a seal between an end of the cathode and the positive end of the container.

18. The method of claim 17, wherein the cell is a cylindrical cell.

19. The method of claim 17, wherein the hot melt material is conductive.

20. The method of claim 17, wherein step (a) comprises punching a ring of hot melt material from a sheet, then placing the ring of hot melt material into the positive end of the container.

21. The method of claim 17, wherein the method further comprises sealing the negative end of the cell with a potting seal.

22. The method of claim 21, wherein the potting seal has non-conductive hot melt material disposed thereon.

23. The method of claim 21, wherein the potting seal has an asphalt adhesive disposed thereon.

24. The method of claim 17, wherein step (b) comprises heating the container to a temperature of at least about 120° C.

25. The method of claim 17, wherein step (b) comprises heating the container to a temperature of at least about 140° C.

26. A method of manufacturing a metal-air cell comprising:
  (a) placing a hot melt material in a negative end of a container;
  (b) placing a cathode in the container while heating the container to a temperature sufficient to flow the hot melt material; and
  (c) pressing the cathode into the hot melt material to form a seal between an end of the cathode and the negative end of the container.

27. The method of claim 26, wherein the cell is a cylindrical cell.

28. The method of claim 26, wherein the hot melt material is conductive.

* * * * *

UNITED STATES PATENT AND TRADEMARK OFFICE
CERTIFICATE OF CORRECTION

PATENT NO.    : 6,265,104 B1
DATED         : July 24, 2001
INVENTOR(S)   : Matthew P. Hull and Gary M. Searle It is certified that error appears in the above-identified patent and that said Letters Patent is hereby corrected as shown below:

<u>Title page,</u>
Item [56], U.S. PATENT DOCUMENTS,
Reference "4,256,815" replace "Similanich" with -- Smilanich --.
Reference "4,343,869" replace "Oltman" with -- Oltman et al. --.
Reference "5,324,332" replace "Jacus" with -- Jacus et al. --.
Reference "5,462,819" replace "Jacus" with -- Jacust et al. --.

Signed and Sealed this

Eighteenth Day of March, 2003

JAMES E. ROGAN
*Director of the United States Patent and Trademark Office*